United States Patent
Dobosz et al.

(10) Patent No.: US 7,952,837 B1
(45) Date of Patent: May 31, 2011

(54) STIFFENED SHAFT BEARING CARTRIDGE

(75) Inventors: Stanislaw Dobosz, Shrewsbury, MA (US); Freeman Fisher, Charlestown, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 911 days.

(21) Appl. No.: 11/536,754

(22) Filed: Sep. 29, 2006

Related U.S. Application Data

(60) Provisional application No. 60/733,072, filed on Nov. 3, 2005.

(51) Int. Cl.
*G11B 5/55* (2006.01)
(52) U.S. Cl. .................. 360/265.4; 360/265.3
(58) Field of Classification Search ............... 360/264.3, 360/265.2, 265.6, 265.7, 265.3, 265.4, 98.07, 360/99.08; 384/120, 126
See application file for complete search history.

(56) References Cited

U.S. PATENT DOCUMENTS

| | | | | |
|---|---|---|---|---|
| 5,295,029 | A * | 3/1994 | Elsing et al. | 360/99.08 |
| 6,246,137 | B1 * | 6/2001 | Obara | 310/90 |
| 6,574,076 | B1 * | 6/2003 | Koyama | 360/265.3 |
| 6,631,053 | B1 * | 10/2003 | Chew | 360/265.6 |
| 6,801,386 | B1 * | 10/2004 | Niroot et al. | 360/97.01 |
| 6,949,852 | B2 * | 9/2005 | Aiello | 310/90 |
| 7,072,148 | B2 * | 7/2006 | Tsuchiya | 360/265.3 |
| 2002/0024770 | A1 * | 2/2002 | Hong et al. | 360/265.2 |
| 2005/0117259 | A1 * | 6/2005 | Uefune et al. | 360/265.2 |
| 2005/0146810 | A1 * | 7/2005 | Mouri et al. | 360/265.6 |

* cited by examiner

*Primary Examiner* — Jefferson Evans
(74) *Attorney, Agent, or Firm* — Westman, Champlin & Kelly, P.A.

(57) ABSTRACT

The present invention is a device for increasing the stiffness of a pivot bearing assembly generally employed along with an actuator assembly of a magnetic disk drive. More specifically, bearing cartridges generally used in the art, are modified with a smaller spacer and a stiffener that is associated with the shaft. This modification reduces the rotating mass of the actuator assembly and increases the stiffness of the pivot assembly about which it rotates, thereby yielding greater system performance by increasing a critical resonance mode frequency.

12 Claims, 6 Drawing Sheets

STIFFENED SHAFT BEARING CARTRIDGE

CROSS-REFERENCE TO RELATED APPLICATIONS

This application claims the benefit of U.S. Provisional Patent Application Ser. No. 60/733,072 filed Nov. 3, 2005, which is incorporated by reference in its entirety herein.

FIELD OF THE INVENTION

The present invention relates to a hard disk drive having improved seek performance. More specifically, the present invention relates to increasing the shaft stiffness of a disk drive actuator assembly, thereby increasing the frequency of the system mode and reducing rotating inertia and moving mass of the actuator assembly while avoiding elementary thermal expansion mismatch between the shaft and E-block in an actuator assembly.

BACKGROUND OF THE INVENTION

Hard disk drives store information on magnetic disks. Typically, the information is stored on concentric tracks of the disk that are divided into servo sectors and data sectors. Information is written to or read from the disk by a transducer or head, mounted on an actuator arm that positions the transducer over the disk in a predetermined location. Accordingly, the movement of the actuator arm allows the transducer to access the different tracks of the disk. The disk is rotated by a spindle motor at a high speed, allowing the transducer to access different sectors within each track of the disk.

A voice coil motor in combination with a servo control system is usually employed to position the actuator arm. The servo control system performs the function of seek control and track following. The seek function is initiated when a command is issued to read data from or write data to a target track on the disk. Once the transducer has been positioned sufficiently close to the target track by the seek function of the servo control system, the track following function of the control system centers and maintains the transducer on the target track until the desired data transfer is completed.

Typically, the transducer will oscillate about the centerline of the target track for a period of time following the transition of the servo control system from the seek mode to the track following mode. These off-track displacements, or post-seek oscillations (PSO), are due, at least in part, to mechanical vibrations generated by the components of the disk drive during the seek and/or tracking operation. In addition, while in the track following mode, adjustments to the position of the transducer with respect to the centerline of the target track are often required due to these same or similar mechanical vibrations. Such adjustments are required to correct drift in the position of the transducer relative to the target track. The precise control of the position of the transducer relative to a target track has become increasingly important as track densities (or tracks per radial inch—TPI) in disk drives have increased. More specifically, the number of tracks included on a disk, i.e., the greater the TPI, translates to higher data storage capability. However, the increased number of tracks means that there is a more stringent requirement that the transducer stay on track for both reading and writing purposes as the separation distance between adjacent tracks decreases. A measure of how far the transducer is off target is termed "Track Misregistration" (TMR). It can be measured in distance (e.g., microns) or as a percentage of track pitch. TMR is also referred to as off track or track following errors.

The actuator assembly generally includes one or more actuator arms interconnected to a part, commonly known as an E-block in the art, having an aperture for receiving a shaft and associated bearing that allows the actuator assembly to freely rotate about the axis of the shaft. Each actuator arm includes a load beam supplying a slider which incorporates the previously described transducer. Components of the actuator assembly generate vibrational loads that impair the ability of the actuator assembly to position and maintain the transducer over a desired track. The actuator assembly also includes a yoke and voice coil that contribute to the vibrational loads. To account for vibrational loads, during the design phase, the amount of vibration from the assembled components may be assigned a budget that must not exceed a predetermined level of generated vibration, thus minimizing TMR and post seek oscillation errors. These budgets are based upon vibrations originating from a number of sources and take on various forms including, but not limited to, electrical noise torque, whirl, arm mode, drum mode, ball bearing tones, high frequency turbulence, disk vibration, aerodynamic torque, and external vibration or seek settle. More specifically, the vibrational loads are generated by the different modes of vibrational motion generated by the components of the actuator assembly. Minute vibrational loads that emanate from the aerodynamic loading of the disk and/or actuator moving through the air inside the disk drive housing may also affect TMR and post seek oscillations. Thus, it is important for designers of disk drives to reduce the individual sources of vibrational loads and/or alter resonance frequencies of disk drive components that influence positioning of the transducer to produce a disk drive that allows the servo control system to better compensate for post seek oscillations and TMR.

In addition to the post seek oscillations and TMR generated by the components of the actuator assembly, post seek oscillations are also caused by the acceleration and deceleration of the actuator assembly as the actuator arms) moves from a current track to a target or intended track. As the actuator moves, resonance frequencies may be exited. The primary or system resonant mode is the most significant in that it limits the ability of the servo control system to compensate for the PSO and TMR and is evidenced by in-plane butterfly-like displacements of the actuator head relative to the voice coil. The system mode frequency is generally on the order of about 5-10 Khz.

The negative effects of post seek oscillations and TMR are most easily described by a brief discussion of track pitch. The distance between two concentric tracks of a disk is known as track pitch, which decreases as TPI increases. For example, a disk with 100,000 TPI has generally a track pitch budget of 0.25 microns (approximately 10 millionths of an inch), wherein a disk with a 150,000 TPI has a track pitch of about 0.17 microns (approximately 7 millionths of an inch). As described above, each vibrating component of a disk drive has a budget that contributes to the maximum allowable TMR that are correctable by the servo control system. That is, vibrational induced oscillations of the transducer must be maintained at or below a level where the servo controller can effectively counteract the movement and control the position of the transducer. This level is predetermined in the design of a disk drive. Returning now to the above example in which TPI is increased from 100,000 to 150,000, and the same servo controller is used in each instance, vibrations generated by the disk drive components increase as a percentage of the total budget. Therefore, it is desirable to implement means of reducing vibrations such as by stiffening the actuator assembly and/or reducing mass or rotating inertia to effectively shift the frequency of the system mode.

It is thus often desirable to stiffen the pivot bearing to alter the natural frequency of the actuator assembly thereby allowing the servo system of the disk drive to be more able to counteract vibration from other components of the disk drive. The E-block of the actuator assembly is usually rotatably interconnected to a plurality of ball bearings and a spacer to a stationary shaft. Although embodiments contemplated herein are based on ball bearings, one skilled in the art will appreciate that other types of bearings, such as roller, needle, etc., may be employed without departing from the scope of the invention. The stationary shaft includes a flange at one end for interconnection to the base plate of a disk drive housing. An upper ball bearing assembly and a lower ball bearing assembly are positioned around the external diameter of the shaft. Each ball bearing assembly is comprised of an inner race, which is interconnected to the stationary shaft, and an outer race, which is interconnected to the E-block. The inner and outer races are separated by a plurality of ball bearings. A shaped spacer separates the upper ball bearing assembly and the lower ball bearing assembly and acts as a labyrinth seal. The outer race of the upper ball bearing assembly and the lower ball bearing assembly are bonded to the E-block. The spacer functions to separate the ball bearing assemblies and to form a labyrinth seal with the shaft/stiffener. This type of assembly is generally known as a "sleeveless cartridge", other pivot assemblies of the prior art include a cylindrical sleeve positioned exterior to the ball bearings and the spacer and bonded to the E-block. As one skilled in the art will appreciate, a stiffener can be employed along with an actuator bearing cartridge assembly with a sleeve that does not necessarily reduce the rotating mass of the E-block but still improves the system mode frequency.

Currently, interconnection of the E-block to the pivot bearing includes bonding the outer diameters of the upper and lower ball bearing assemblies to the inner diameter of an aperture integrated into the E-block. In order to interconnect the components, a tolerance ring may be employed, which is generally a corrugated metal strip that acts as an interface between two mechanical objects, to secure the ball bearing assemblies to the E-block by interference fit. The typical assembly process is separated into two separate processes/operations: 1) the assembly of the bearing cartridge and 2) the assembly of the completed bearing cartridge into the E-block. Generally, the bearing cartridge sub-assembly requires an adhesive that is cured at room temperature to substantially avoid thermal stresses. The cartridge is then vacuum baked to eliminate high volatility components from the adhesives. The hearing cartridge is bonded to the E-block at a high temperature that is conducive to eliminating these volatile elements from the adhesive that is not too high wherein thermal expansion of the E-block overstresses the bearing cartridge. An adhesive or bonding material may also be used between the outer bearing races and the E-block.

Heat is also generated by normal disk drive operations that causes thermal expansion of the shaft and the spacer. If the material of the shaft is not the same or substantially similar to the spacer, the inner and outer races of the ball bearing assemblies will move relative to each other. This relative movement may damage the ball bearing assemblies thereby causing track misregistration. More specifically, the thermal expansion rate of stainless steel differs from the thermal expansion rate of aluminum. Generally, aluminum has a linear rate of expansion of $24 \times 10^{-6}$ per degree centigrade and stainless steel has a linear rate of expansion on the order of $\sim 10 \times 10^{-6}$ per degree centigrade. Accordingly, where the shaft is made from one of these two materials and the spacer is made from the other, relative movement can occur between the two due to the different rates of thermal expansion. In addition, as the shaft and the spacer are heated and cooled, forces generated by the different rates of expansion and contraction may cause ball bearing debonding from the E-block.

SUMMARY OF THE INVENTION

Thus, it is desirable in the field of magnetic disk drive construction to provide a device and method that provides an actuator assembly that effectively alters the system mode frequency by stiffening the actuator assembly with respect to the shaft it rotates about and/or reducing the rotating mass and inertia of the E-block.

One embodiment of the present invention is a stiffening member for interconnection to the outer radius of a pivot bearing shaft. The stiffener communicates with a spacer that is located adjacent to the cylindrical wall of the E-block formed to receive the shaft and is integrated between the upper ball bearing and the lower ball bearing commonly used in pivot bearings thereby forming a labyrinth seal to restrict axial flow of air from escaping the bearing assembly. An added benefit of employing the spacer as contemplated herein, instead of the shaped spacer of the prior art, is that the mass of the shaped spacer is reduced thereby reducing the mass and mass moment of inertia of the entire actuator assembly. The decrease in mass and moment of inertia may also equate to a decrease in power needed to rotate the actuator arm and a higher system mode frequency. More specifically, the E-block of the actuator assembly is generally comprised of aluminum, a lightweight material that reduces the amount of energy needed to rotate the actuator assembly. The ball bearings are generally comprised of steel or ceramic. The rotating mass of the actuator assembly thus includes the outer race of the upper ball bearing, the outer race of the lower ball bearing, the spacer and the E-block. Decreasing the mass and/or moment of inertia of any portion of the actuator assembly will reduce the amount of energy needed to rotate the actuator assembly, will also increase the system mode frequency and will thereby improve seek time.

More specifically, the increased stiffness and mass reduction provided by embodiments of the present invention translates to an increase of the system mode frequency. The system mode, which is an in-plane, butterfly-like motion actuator assembly, is a particular concern since it greatly affects off track and seek performance of a disk drive. It is desirable to shift the system mode to a higher frequency thereby more ably allowing the servo system of the disk drive to counteract vibration from other components of the disk drive.

The embodiments of the present invention employ an aluminum spacer for interaction with an aluminum stiffener positioned around an aluminum pivot assembly shaft. The use of aluminum shaft plus a stiffener provides greater stiffness than an aluminum shaft alone. As will be understood by one skilled in the art, the use of a stainless steel shaft and a stainless steel stiffener in conjunction with a stainless steel spacer will further increase the stiffness of the system, but has greater mass and mass moment of inertia and may increase seek time. In addition, one skilled in the art will appreciate that any other materials may be employed for the shaft, stiffener and the spacer without departing from the scope of the invention and the descriptions concerning aluminum and stainless steel shafts, stiffeners, and spacers as outlined herein are for representative purposes only.

Disk drives of the prior art usually employ an aluminum shaft or a stainless steel shaft in combination with a shaped spacer and have a system mode frequency of about 7,680 Hz and 7,900 Hz, respectively. Analysis of specific disk drive designs has shown that the addition of an aluminum stiffener to an aluminum shaft in conjunction with an aluminum spacer provides an actuator assembly of lower mass and a system mode frequency of about 7,790 Hz, an improvement over that of the prior art. Analysis has also shown that by adding a stainless steel stiffener to the stainless steel shaft of the prior art, the system mode is increased to 7,960 Hz.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

Figure 1:
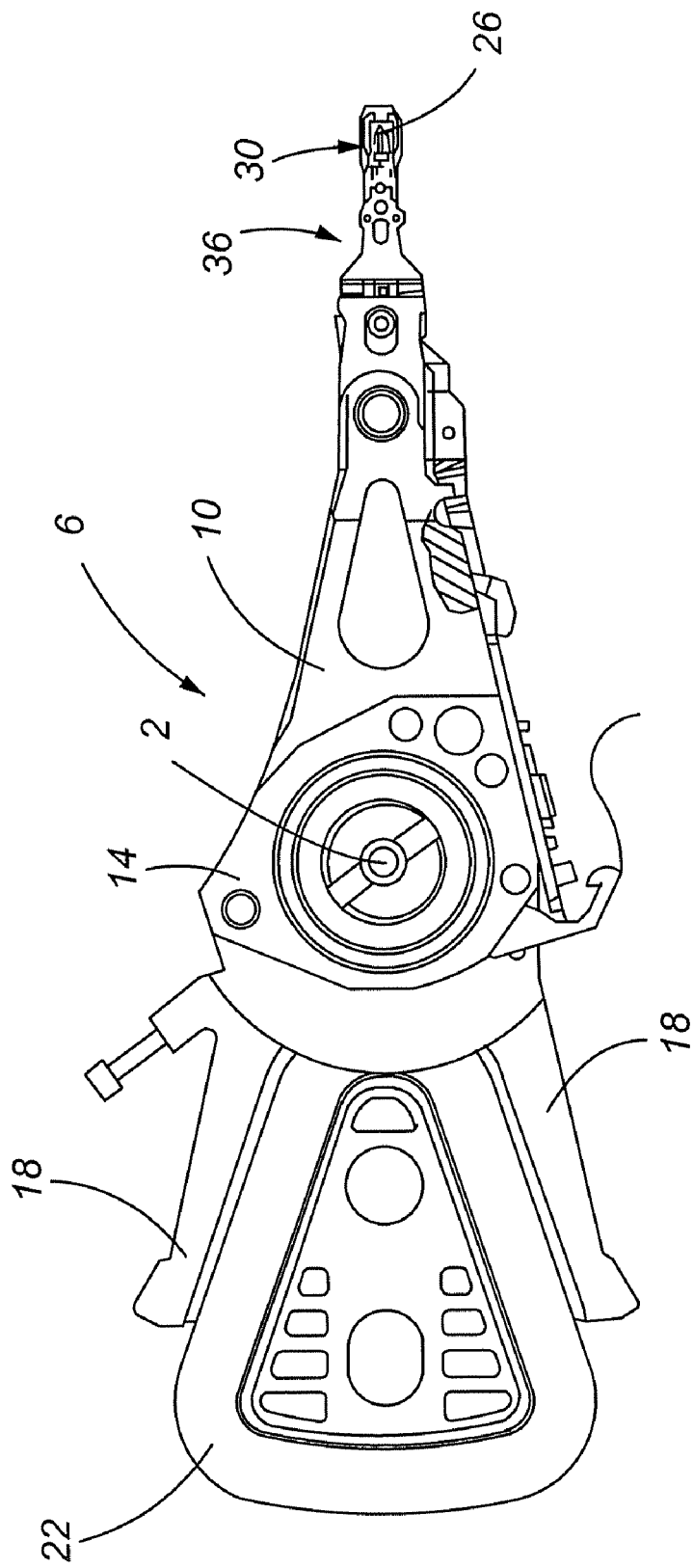
FIG. 1 is a top plan view of an actuator assembly generally employed in a disk drive.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-6, a pivot bearing cartridge 2 for an actuator assembly 6 is shown. More specifically, an actuator assembly 6 of a disk drive includes a plurality of actuator arms 10 that are interconnected to a centralized E-block 14. Two arms 18 are also included that provide a location or yoke for interconnection of a voice coil 22. The E-block 14 includes an aperture therethrough for the receipt of a pivot bearing 2 that allows the actuator assembly 6 to freely rotate when electromagnetic attractive and repulsive forces interact with the voice coil 22. The rotation of the actuator assembly 6 places a transducer or read/write element 26 over preselected areas of a rotating disk to read and/or write data from or to the disk. The read/write element is positioned on a slider 30 which, in turn, is connected to suspension 36 attached to the distal end of the actuator arm 10. The present invention is designed to stiffen the pivot bearing cartridge 2 thereby lessening the affect of vibrations on the transducer head 26. This is accomplished by increasing the shaft stiffness and decreasing the mass of the rotating part of the bearing cartridge 2 that interconnects to the E-block 14. This results in increasing natural frequency of the system mode of the actuator assembly 6.

Figure 2:
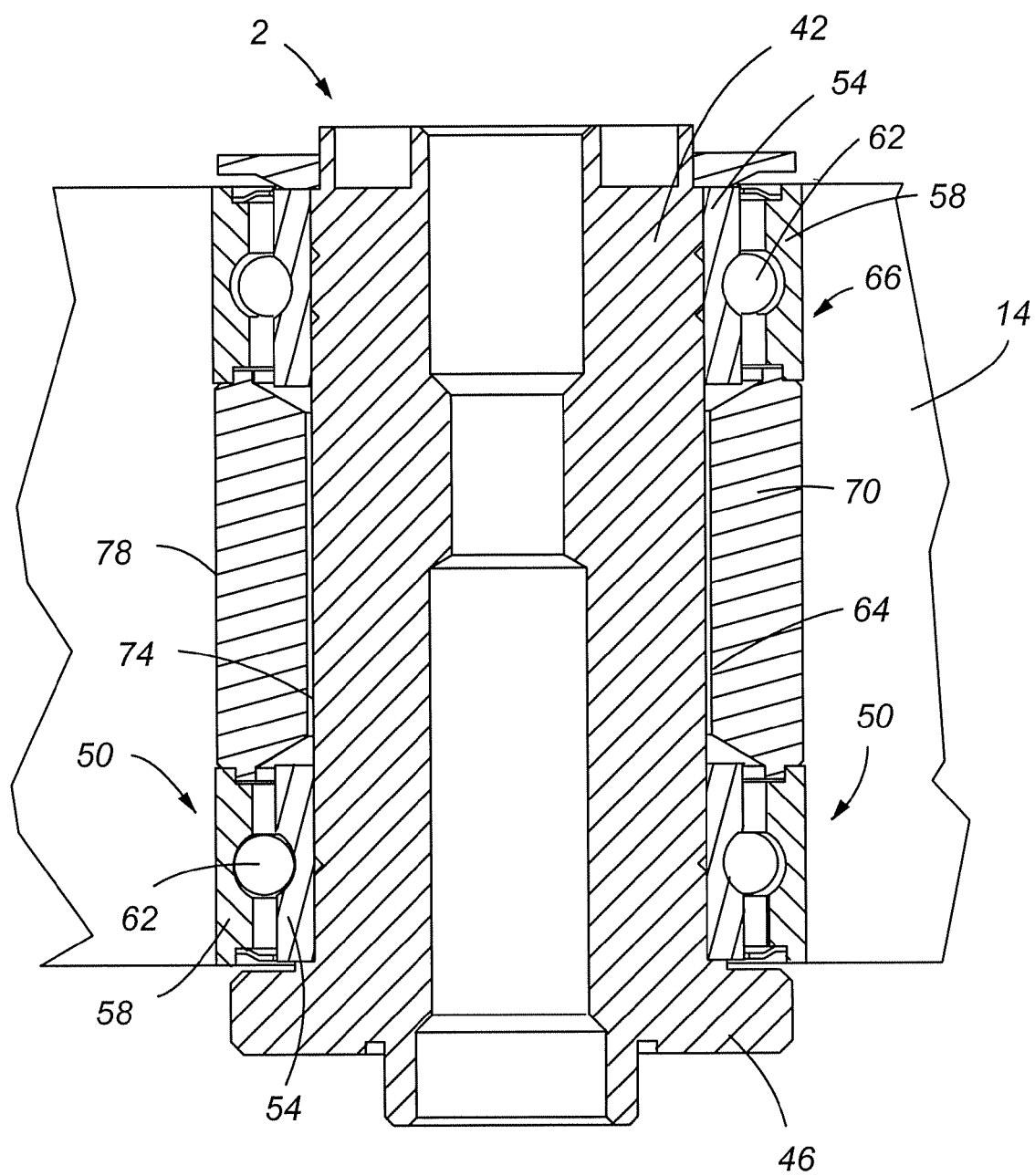
FIG. 2 is a cross-sectional front elevation view of a pivot bearing cartridge assembly for rotatable interconnection to an actuator assembly of the prior art.

Referring now to FIG. 2, a pivot bearing 2 of the prior art is shown. More specifically, pivot bearings 2 of the prior art include a stationary shaft 42 having a flange 46 for interconnection to the base plate of the disk drive. A lower ball bearing assembly 50, which is comprised of an inner race 54 and outer race 58 in communication via a plurality of balls 62, and an upper ball bearing assembly 66, which is comprised of an inner race 54 in communication via a plurality of balls 62 with an outer race 58, are interconnected to the exterior diameter 64 of the shaft 42. The inner races 54 of the upper ball bearing assembly 66 and the lower ball bearing assembly 50 are bonded to the outer diameter of the shaft 42. The outer race 58 of the upper ball bearing assembly 66 and the outer race 58 of the lower ball bearing assembly 50 are interconnected via a shaped spacer 70. The shaped spacer 70 is generally an annulus having inner diameter 74 and an outer diameter 78. The inner diameter 74 of the shaped spacer 70 acts as a fluid labyrinth seal that interacts with the outer diameter 64 of the shaft 42 when it rotates. The outer race 58 of the upper ball bearing assembly 66 and the outer race 58 of the lower ball bearing assembly 50 and the outer diameter 78 of the shaped spacer 70 are bonded to the E-block 14 of the actuator assembly and rotates along with the actuator assembly.

Again, as briefly mentioned above, the methods of strengthening the pivot bearing as described herein may be employed on bearing cartridges with sleeves wherein the sleeve is interconnected, with or without a tolerance ring(s), to the E-block. The sleeve in this instance includes a decreased inner diameter portion that provides a location for engagement with the ball bearing assemblies. The decreased inner diameter portion is positioned adjacent to the stiffener to provide a labyrinth seal as described above.

Figure 3:
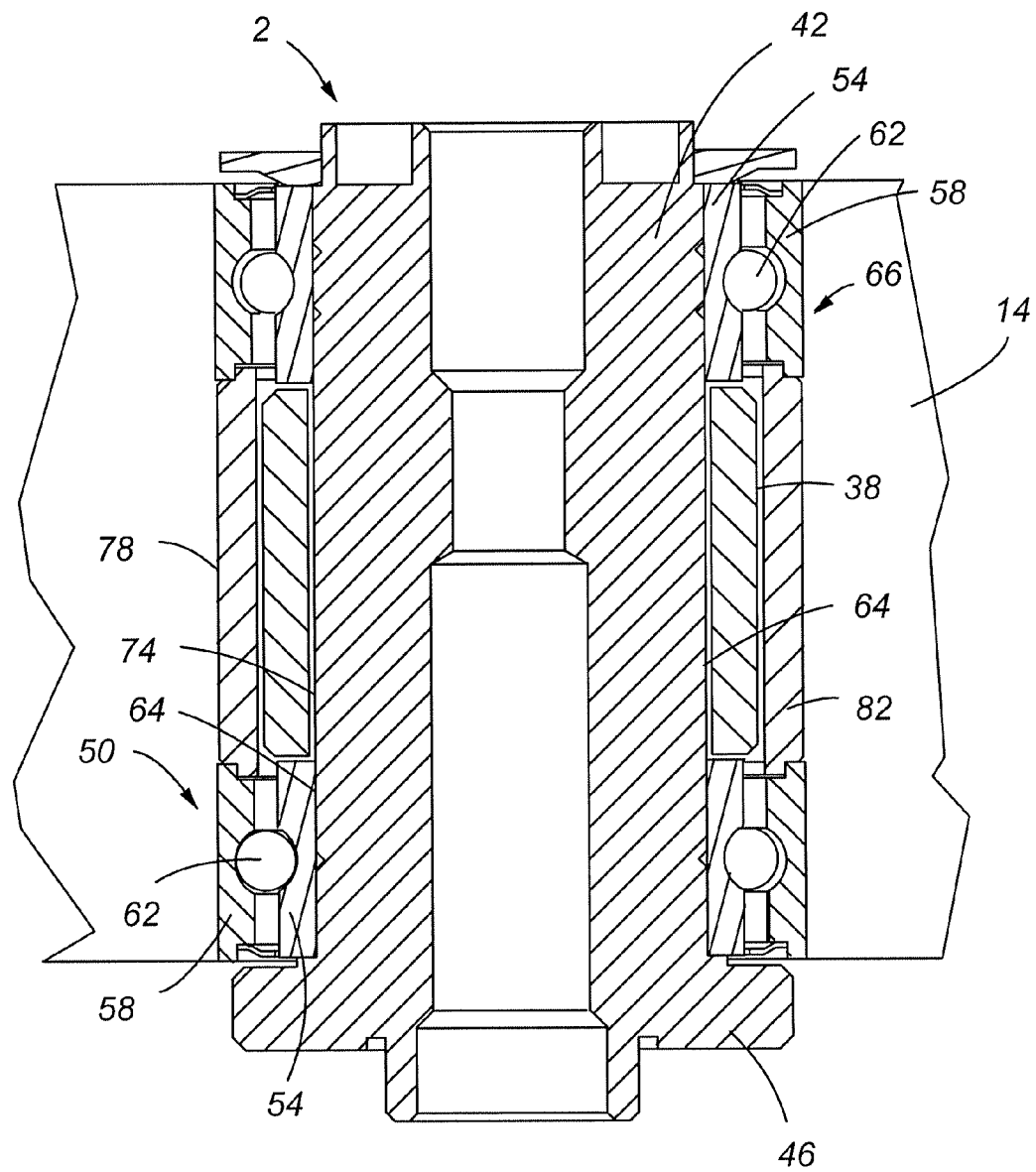
FIG. 3 is a cross-sectional front elevation view of a pivot bearing for rotatable interconnection to an actuator assembly of one embodiment of the present invention.

Referring now to FIG. 3, the pivot bearing 2 of one embodiment of the present invention is shown. The E-block 14 is interconnected to the outer race 58 of the upper bearing 66 and the outer race 58 of a lower ball bearing assembly 50. In addition, a spacer 82 is provided between the outer race 58 of the upper ball bearing assembly 66 and the outer race 58 of the lower ball bearing assembly 50. The spacer 82 interacts with the stiffener 38 that is interconnected about the outer diameter 64 of the shaft 42 thereby providing a labyrinth seal similar to that of the prior art. The shaft of this embodiment of the present invention possesses increased stiffness since the outer diameter of the shaft 42 is increased by the addition of a stiffener 38. In addition, the mass and moment of inertia of the actuator assembly is reduced since the spacer 82 is less massive than the previously described shaped spacer 70 of the prior art.

Embodiments of the present invention generally maintain or increase stiffness by incorporating the stiffener 38. For example, in order to avoid the previously described temperature-related issues, an aluminum spacer 82 is utilized in embodiments of the present invention that possesses substantially the same thermal properties of the E-block 14 and the shaft stiffener and the shaft.

Figure 4:
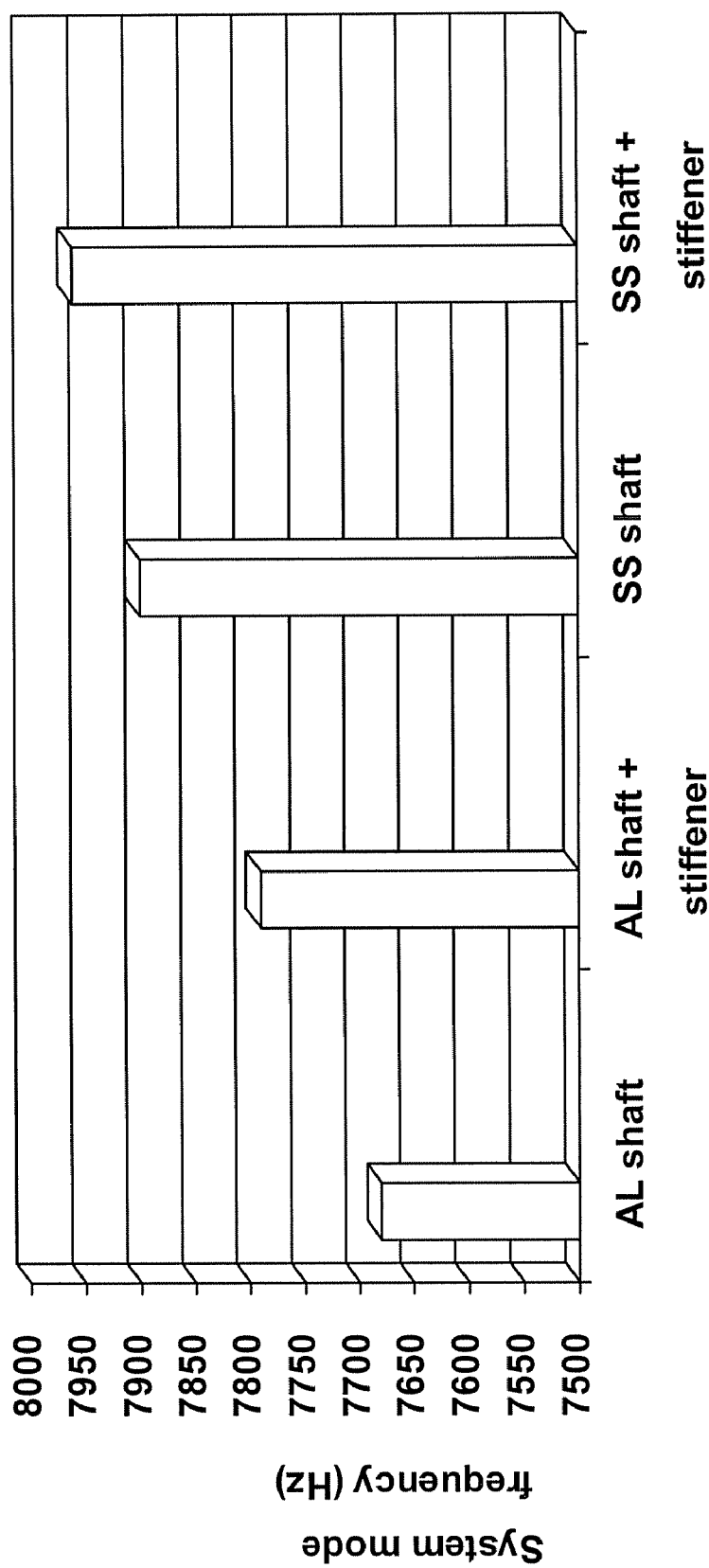
FIG. 4 is a bar graph showing the change in system mode frequency by employing embodiments of the present invention.

In operation, embodiments of the present invention are assembled by sliding the lower ball bearing assembly 50 around the shaft 42 and abutting it against a flange 46, positioning the stiffener 38 about the shaft 42 and abutting it against the lower ball bearing assembly 50, adding the spacers 82 and connecting it to the lower ball bearing assembly 50 and adding the upper ball bearing assembly 66 adjacent to the upper portion of the stiffener 38 and spacer 82. The actuator assembly E-block 14 is bonded to the outer diameter of the bearing cartridge assembly. Referring now to FIG. 4, a bar graph is shown that illustrates the effect of using a stiffener in conjunction with embodiments of the present invention. More specifically, the use of an aluminum shaft yields a system mode frequency of about 7,680 Hz. The employment of an aluminum stiffener along with an aluminum shaft, yields a system mode frequency of 7,790 Hz. That is, instead of using a stainless steel shaped spacer as in the prior art, an aluminum shaft and stiffener in conjunction with an aluminum spacer may be employed that alleviates many of the problems associated using differing materials of various expansion rates. One skilled in the art will appreciate that to further increase stiffness, a stainless steel stiffener may added to the stainless steel shaft that will increase the system mode frequency to about 7,960 Hz. One skilled in the art will also appreciate that the frequencies presented herein are for representative purposes only, the system mode and effect of employing a stiffened pivot assembly will vary depending on the specific design of a particular disc drive.

Figure 5:
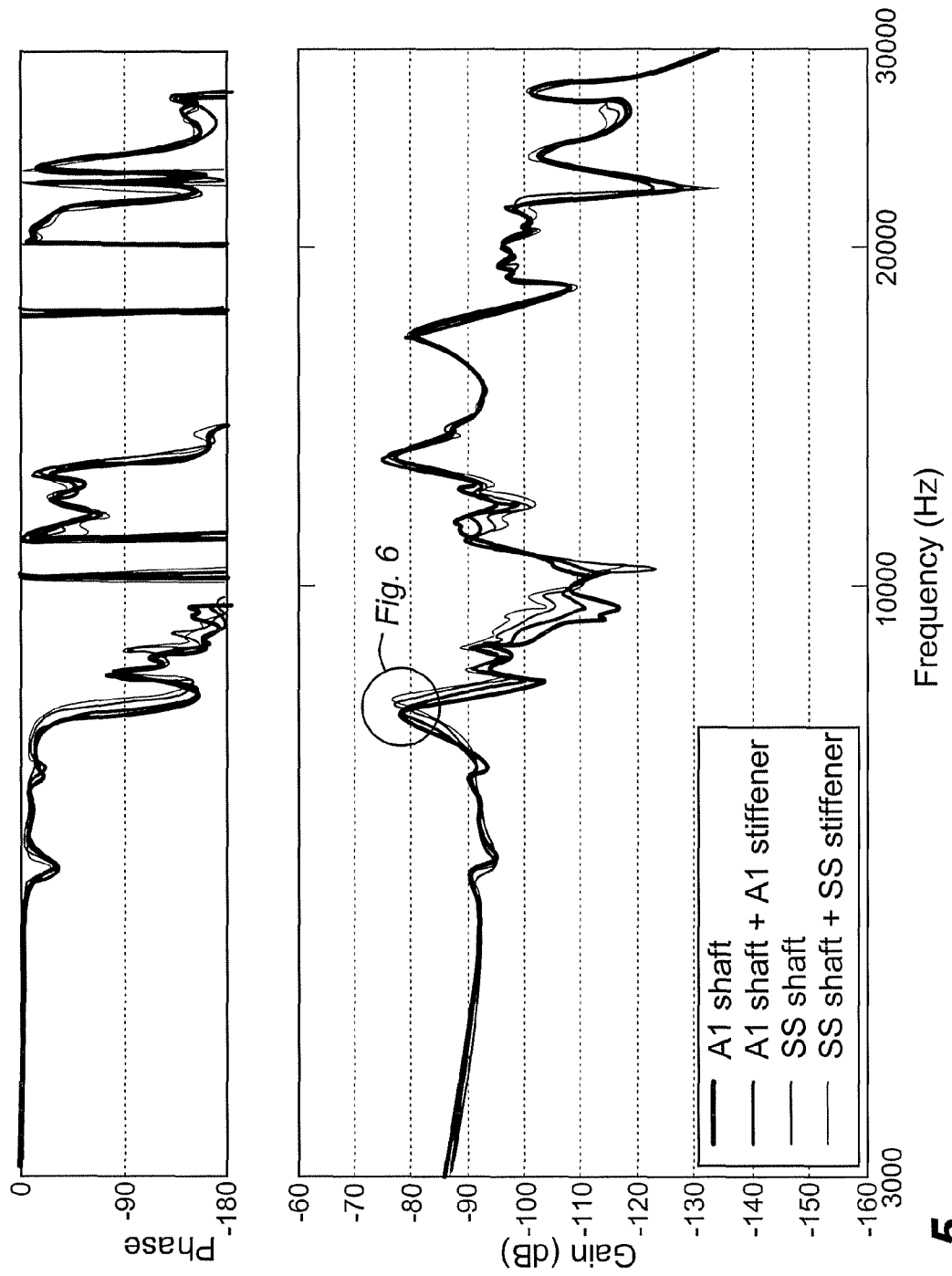
FIG. 5 is a graph illustrating the effects of using embodiments of the present invention on system mode frequency.
Figure 6:
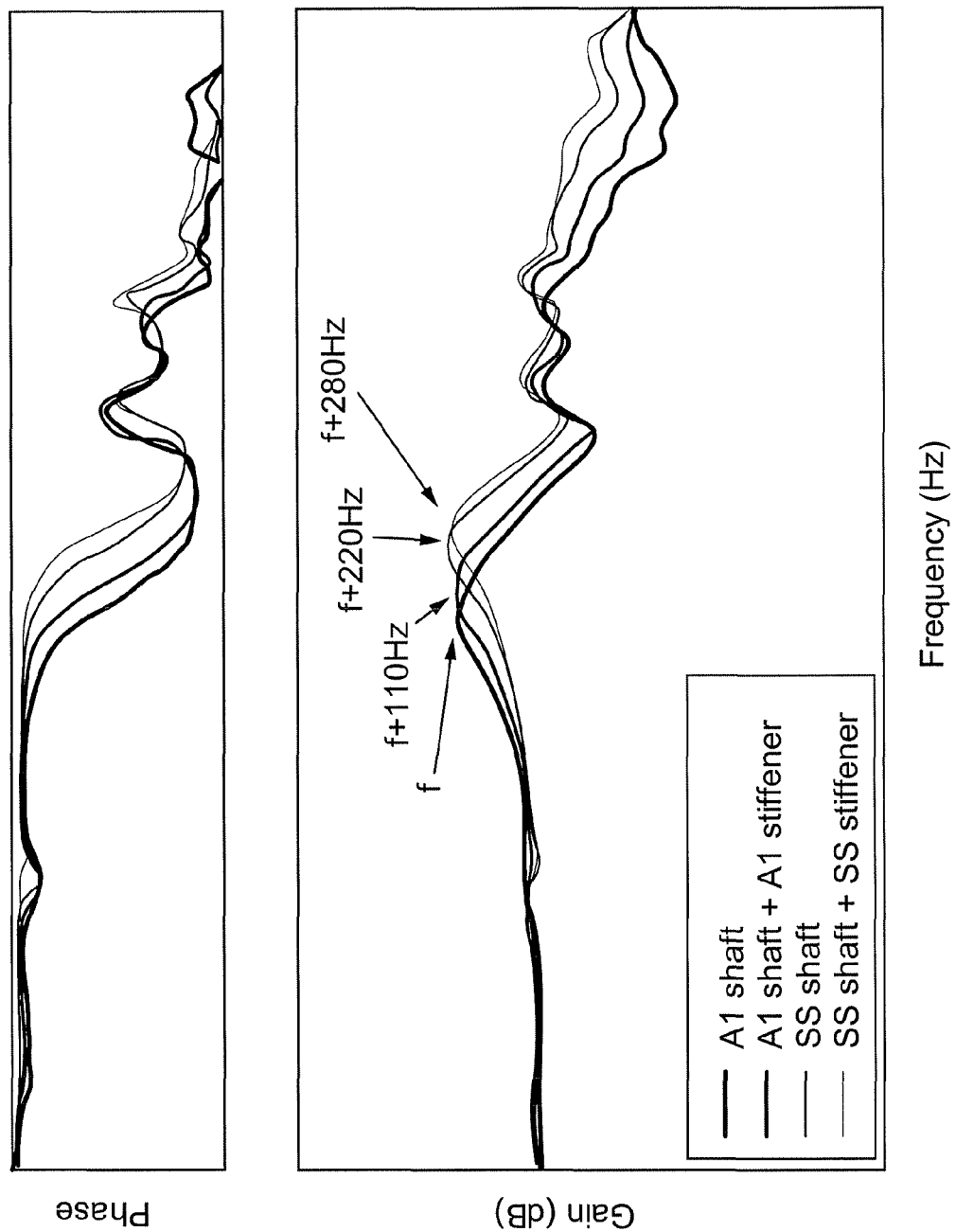
FIG. 6 is a detailed view of the graph of FIG. 5.

Referring now to FIGS. 5 & 6 another representation of the effects of using shaft stiffeners is provided. More specifically, these graphs clearly show how the system mode frequency is shifted with an aluminum shaft bearing being the base line. By adding an aluminum shaft stiffener to the aluminum shaft the system mode is increased by about 110 Hz, which is only 110 Hz less than the system mode frequency of a stainless steel shaft alone. By adding a stainless steel stiffener to a stainless steel shaft the system mode frequency will increase about 280 Hz over an aluminum shaft or 60 Hz over a stainless steel shaft alone. As one skilled in the art will appreciate, the phases of the system mode will be shifted accordingly.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A pivot assembly, comprising:
    a transducer-positioning actuator;
    a generally cylindrical shaft having a first outer surface;
    a generally cylindrical stiffening mechanism concentrically positioned about said first outer surface and interconnected to said shaft;
    a first friction reducing member interconnected between said shaft and said actuator;
    a second friction reducing member interconnected between said shaft and said actuator; and
    a generally cylindrical spacer positioned between the first and second friction reducing members and having an inner surface adjacent to an outer surface of said stiffening mechanism, thereby forming a labyrinth seal.

2. The pivot assembly of claim 1, wherein said stiffening mechanism lowers the magnitude of post seek oscillations and TMR of the pivot assembly.

3. The pivot assembly of claim 1, wherein said shaft, said generally cylindrical stiffening mechanism, and said generally cylindrical spacer are made from a material having generally the same coefficient of thermal expansion.

4. The pivot assembly of claim 3, wherein said material is at least one of aluminum and steel.

5. A pivot assembly, comprising:
    an actuator;
    a generally cylindrical shaft having an outer surface;
    a generally cylindrical stiffening mechanism having an inner surface and an outer surface and being concentrically positioned about said outer surface of said shaft, said inner surface of said stiffening mechanism being interconnected to said outer surface of said shaft;
    a first friction reducing member interconnected between said shaft and said actuator;
    a second friction reducing member interconnected between said shaft and said actuator;
    a generally cylindrical spacer positioned adjacent to said outer surface of said stiffening mechanism and between the first and second friction reducing members; and
    wherein said outer surface of said stiffening mechanism is in fluidic communication and forms a labyrinth seal with an inner surface of said cylindrical spacer.

6. The pivot assembly of claim 5, wherein said stiffening mechanism lowers the magnitude of post seek oscillations and TMR of the pivot assembly.

7. The pivot assembly of claim 5, wherein said shaft, said generally cylindrical stiffening mechanism, and said generally cylindrical spacer are made from a material having generally the same coefficient of thermal expansion.

8. The pivot assembly of claim 7, wherein said material is at least one of aluminum and steel.

9. A pivot assembly, comprising:
    a transducer-positioning actuator;
    a generally cylindrical shaft having a first outer surface;
    a generally cylindrical stiffening mechanism concentrically positioned about said outer surface and interconnected to said shaft;
    a first friction reducing member interconnected between said shaft and said actuator;
    a second friction reducing member interconnected between said shaft and said actuator;
    a generally cylindrical spacer having an inner surface positioned adjacent to an outer surface of said stiffening mechanism, thereby forming a labyrinth seal, said generally cylindrical spacer being interconnected to both said first friction reducing member and said second friction reducing member; and
    wherein an outer surface of said stiffening mechanism is in fluidic communication with an inner surface of said cylindrical spacer.

10. The pivot assembly of claim 9, wherein said stiffening mechanism lowers the magnitude of post seek oscillations and TMR of the pivot assembly.

11. The pivot assembly of claim 9, wherein said shaft, said generally cylindrical stiffening mechanism, and said generally cylindrical spacer are made from a material having generally the same coefficient of thermal expansion.

12. The pivot assembly of claim 11, wherein said material is at least one of aluminum and steel.

* * * * *